(12) United States Patent
Walz et al.

(10) Patent No.: US 11,059,136 B2
(45) Date of Patent: Jul. 13, 2021

(54) WORKPIECE HOLDER DEVICE

(71) Applicant: Gebr. Heller Maschinenfabrik GmbH, Nürtingen (DE)

(72) Inventors: Juergen Walz, Frickenhausen (DE); Erhard Hummel, Schlierbach (DE)

(73) Assignee: GEBR. HELLER MASCHINENFABRIK GMBH, Nürtingen (DE)

( * ) Notice: Subject to any disclaimer, the term of this patent is extended or adjusted under 35 U.S.C. 154(b) by 103 days.

(21) Appl. No.: 16/199,779

(22) Filed: Nov. 26, 2018

(65) Prior Publication Data
US 2019/0160614 A1 May 30, 2019

(30) Foreign Application Priority Data
Nov. 28, 2017 (DE) ...................... 10 2017 128 099.5

(51) Int. Cl.
*B23Q 3/08* (2006.01)
*B23Q 3/06* (2006.01)
(Continued)

(52) U.S. Cl.
CPC ............ *B23Q 3/062* (2013.01); *B23Q 1/525* (2013.01); *B23Q 3/103* (2013.01);
(Continued)

(58) Field of Classification Search
CPC . B23Q 3/062; B23Q 3/00; B23Q 3/06; B23Q 3/154; B23Q 1/525; B23Q 3/103; B23Q 11/0014
(Continued)

(56) References Cited

U.S. PATENT DOCUMENTS 3,581,656 A * 6/1971 Pappas ................. B30B 15/042
100/214
5,695,177 A * 12/1997 Mascola ................ B25B 5/062
269/20
(Continued)

FOREIGN PATENT DOCUMENTS

CN 101321602 A 12/2008
CN 103008707 A 4/2013
(Continued)

OTHER PUBLICATIONS

German Patent Office, Office Action, Application No. 10 2017 128 099.5, dated Sep. 19, 2018, 6 pages.
(Continued)

*Primary Examiner* — Lee D Wilson
(74) *Attorney, Agent, or Firm* — Cantor Colburn LLP

(57) ABSTRACT

A workpiece holder device for a machine tool has a holder, which has a support part and a holder part. The support part supports the holder on a support device, preferably so that the holder can rotate about an axis of rotation. The holder part is set up to hold a workpiece directly or indirectly. To avoid, or at least minimize deviations from a desired alignment of the holder part based on elastic deformation of the holder due to the weight force of the workpiece, the holder has at least one mechanical or hydraulic pretensioning device arranged on or in it. The pretensioning device can be used to pretension the material of the holder, so that the pretensioning device applies a tensile stress or a compressive stress to at least one part of the holder. This can counteract a deviation of position due to an elastic deformation of the holder.

12 Claims, 5 Drawing Sheets

(51) Int. Cl.
  *B23Q 11/00* (2006.01)
  *B23Q 1/52* (2006.01)
  *B23Q 3/10* (2006.01)
  *B23Q 1/01* (2006.01)
  *B25B 5/14* (2006.01)

(52) U.S. Cl.
  CPC ............ *B23Q 11/0014* (2013.01); *B23Q 1/01* (2013.01); *B23Q 11/001* (2013.01); *B25B 5/14* (2013.01)

(58) Field of Classification Search
  USPC ................. 269/43, 45, 291, 292, 329, 9
  See application file for complete search history.

(56) References Cited

U.S. PATENT DOCUMENTS

| | | | | |
|---|---|---|---|---|
| 7,507,887 | B1* | 3/2009 | Blanchard | G10D 3/06 84/293 |
| 8,985,916 | B2 | 3/2015 | Kocherovsky et al. | |
| 9,180,642 | B2* | 11/2015 | Bauersachs | B21J 13/04 |
| 2013/0117985 | A1* | 5/2013 | Siraky | F16B 35/041 29/426.5 |

FOREIGN PATENT DOCUMENTS

| | | |
|---|---|---|
| CN | 103009155 A | 4/2013 |
| CN | 203726146 U | 7/2014 |
| CN | 204805264 U | 11/2015 |
| CN | 103978379 B | 8/2016 |
| DE | 84 18 541 U1 | 12/1984 |
| DE | 195 04 916 A1 | 8/1996 |
| DE | 102012022890 A1 | 5/2014 |
| DE | 10 2014 118134 A1 | 6/2016 |

OTHER PUBLICATIONS

European Patent Office, Search Report, Application No. 18206817.1, dated May 3, 2019, 7 pages.
CN First Office Action; Application No. 201811424399.0; dated Feb. 22, 2021; 9 pages.
English Translation of CN First Office Action; Application No. 201811424399.0; 4 pages.
English Translation of CN Search Report; Application No. 201811424399.0; dated Feb. 9, 2021; 4 pages.

* cited by examiner

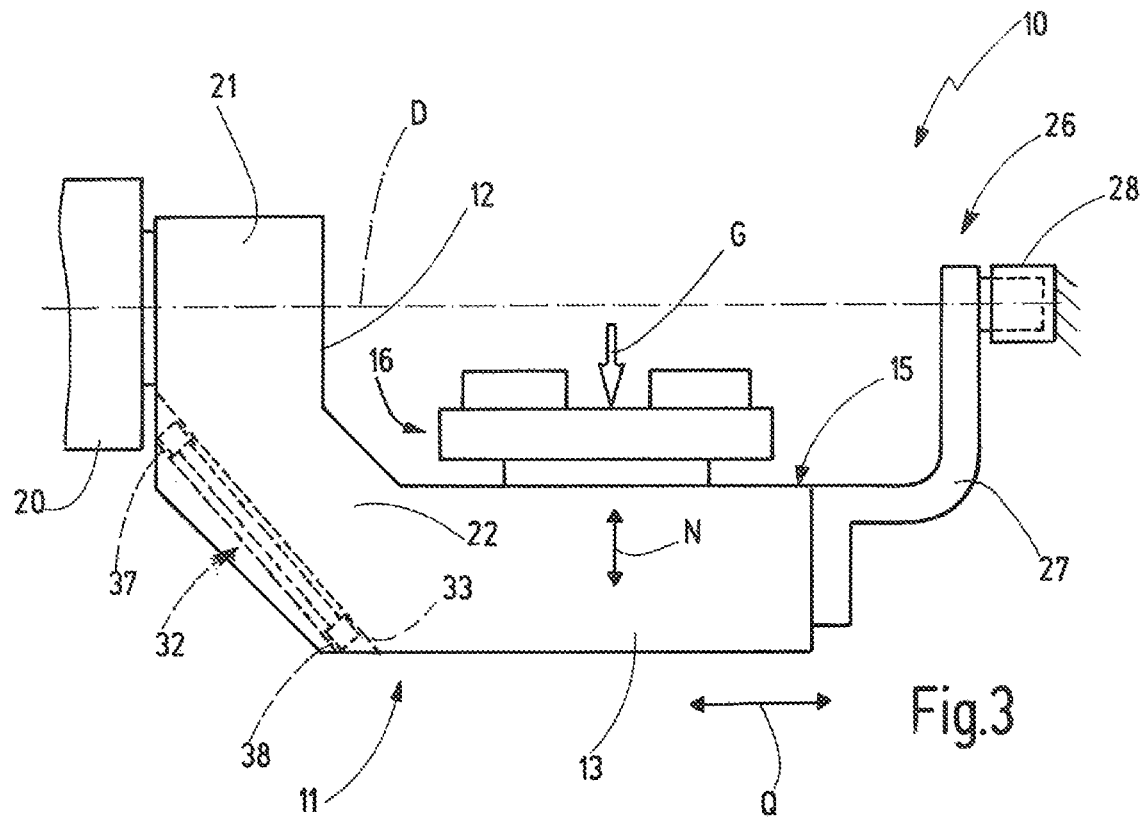
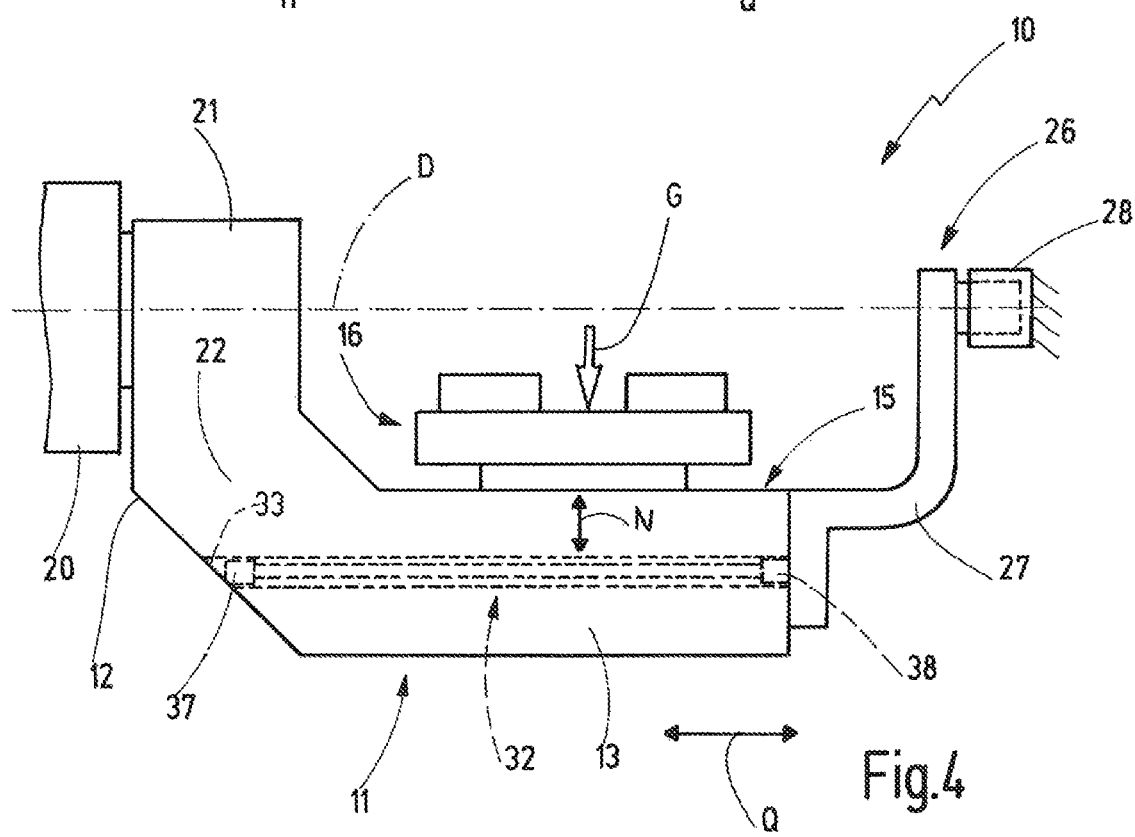

WORKPIECE HOLDER DEVICE

CROSS-REFERENCE TO RELATED APPLICATION

This application claims the benefit of German patent application No. 10 2017 128 099.5, filed Nov. 28, 2017, the disclosure of which is hereby incorporated herein by reference in its entirety.

TECHNICAL FIELD

The invention relates to a workpiece holder device for a machine tool. The workpiece holder device has a holder to hold or clamp a work piece. The holder can be supported so that it can engage in linear and/or rotational motion relative to a machine frame or a machine base of the machine tool.

BACKGROUND ART

EP 2 495 069 B1 describes a machine tool with a work table. The work table is supported on two rails that are arranged on top of one another in the vertical direction, and it can be made to travel along these rails. The work table has a sensor arranged on it to measure the horizontal alignment of the work table. Oscillations or vibrations in the machine tool can displace the work table out of its ideal horizontal position. A hollow space in the work table adjacent to at least one of the rails has a piezo actuator arranged in it. The piezo actuator is able to make the work table undergo elastic deformation. During operation of the machine tool, the piezo actuator is controlled on the basis of the value measured by the sensor to compensate for oscillations and vibrations and maintain the horizontal alignment of the work table.

Such piezo actuators can achieve rapid control during operation of the machine tool. However, the travel and elastic deformation that they can achieve are relatively small. A piezoelectric actuator implementation can be sufficient to compensate for influences due to vibrations and oscillations.

A machine tool with position correction by a piezo actuator is also disclosed in WO 00/37213 A2. During machining, the piezo actuators can compensate for a deviation in a position, in particular a position of a tool spindle, by controlling the piezo actuator.

EP 2 623 257 B1 describes a machine tool with a position compensation device. The machine tool contains, adjacent to a spindle, pressure elements that can be formed by hydraulic pressure intensifiers, for example. The application of pressure by the pressure element can adjust the spindle in the direction radial to the axis of the spindle. Depending on the position of the one or more pressure element(s), it is possible to make an adjustment in one or more radial directions with respect to the axis of the spindle.

This invention is based on the problem that when the workpiece holder device is loaded by the workpiece, the weight force of the workpiece can cause a deformation. Depending on the size of the workpiece, this can cause machining inaccuracies, since the workpiece is not located in an assumed, defined desired position in the workpiece holder device.

Therefore, it is the goal of this invention to create a workpiece holder device that at least reduces such deviations.

SUMMARY OF THE INVENTION

The workpiece holder device for a machine tool according to this invention has a holder with a support part and a holder part. The support part is connected with a support device. The support part is set up to support the holder on the support device. The support can allow the holder to move in one or more degrees of freedom, according to the example in a rotational degree of freedom about an axis of rotation. The holder part extends away from the support part in a transverse direction. The transverse direction can be horizontally oriented. The holder part is set up to hold the workpiece indirectly or directly. For example, a holding device to hold a workpiece can be arranged on the holder part. The holding device can be designed, for example, to clamp the workpiece.

The holder has at least one pretensioning device arranged in and/or on it. A preferred sample embodiment has at least two pretensioning devices. The pretensioning device can pretension at least one part of the support part and/or of the holder part. The pretension can be a tensile stress or tensile force or a compressive stress or compressive force. The pretension is preferably preset before the machining of a workpiece, and remains unchanged especially during the operation of the machine tool. The pretension can be, so to speak, static or quasistatic. Preferably, there is no dynamic change in the pretension while the workpiece holder device is being used or while the machine tool is in operation.

Introducing the pretension into at least one section of the holder can counteract the deformation of the holder due to the weight force of a workpiece arranged on the holder. This can achieve a desired alignment of the holder part in the transverse direction or horizontal direction under the load of the workpiece. In particular, the pretension is introduced into the part of the holder in which the holder part is connected with the support part. The pretensioning device can be arranged exclusively in the support part, or some sections of it can be arranged in the support part and other sections of it can be arranged in the holder part.

Preferably, the amount of pretension in at least one pretensioning device is selected to change the modulus of elasticity of the pretensioned part of the support part and/or of the holder part. In this embodiment, the modulus of elasticity of the holder is not linear, so that it can be changed, in particular reduced, by introducing the pretension. This in turn has the result that placing a load on the holder part produces a smaller deviation of position due to elastic deformation, since this deviation of position or elastic deformation is dependent on, in particular is proportional to, the modulus of elasticity.

It is preferred that at least one pretensioning device be anchored with the holder at a first end and a second end opposite the first end, and that the pretension be produced between these ends. The distance between the first end and the second end is preferably at least 100 mm or at least 140 mm. The pretensioning device can extend in a straight line between the two ends. The pretensioning device can work mechanically and/or hydraulically. Preferably, the at least one pretensioning device is free of electrically controllable actuators.

In one sample embodiment, the at least one pretensioning device can have a first bushing at the first end and a second bushing at the second end. Each bushing has a bushing inner thread and a bushing outer thread. At least one of the bushings has different thread leads or thread pitches on the bushing inner thread and on the bushing outer thread. The bushing outer thread of each of the bushings is preferably screwed into a holder inner thread of the holder.

Moreover, the pretensioning device can have a rod, in particular a threaded rod, which connects the two bushings and which is, according to the example, screwed into a bushing inner thread of each of the two bushings. The effective length of the rod between the two bushings defines the pretension introduced into the holder. The difference in the thread pitches on at least one of the bushings makes it possible to change this effective length of the rod and thus adjust the pretension. The smaller the difference in the thread pitches on the at least one bushing, the smaller the torque required to set a desired pretension.

In an alternative sample embodiment of the workpiece holder device, the at least one pretensioning device is formed by a pressure chamber. In the pressure chamber, a fluid pressure can be produced to form the pretension. The pressure chamber can preferably have a cylindrical shape. The pressure chamber can be formed, for example, within a tube that is integrally cast in the holder as the holder is produced, and it can be sealed fluid-tight at opposite ends to form the pressure chamber.

The pretension can be used to adjust the holder part on the basis of the weight or the weight force of the work piece to be machined, in particular before the machining of the work piece in the machine tool. During operation, the pretension preferably does not change. Alternatively, the pretension could also be controlled through open-loop and/or closed-loop control before and/or during operation of the machine tool.

It is preferred that multiple pretensioning devices be present. The pretensioning devices can be arranged parallel to one another in the holder.

Moreover, it is advantageous for it to be possible to adjust or preadjust the pretensions of different pretensioning devices independently of one another.

If multiple pretensioning devices are present, they are preferably arranged symmetrically to a midplane through the holder. The midplane runs parallel to the transverse direction.

Moreover, it is advantageous if the at least one pretensioning device has a first end and a second end opposite the first end. The first end and the second end are arranged offset to one another in a normal direction at right angles to the holder part. This arrangement can make the pretensioning device extend at an angle through a bent and/or curved area of the holder, in particular in the connection area between the holder part and the support part.

The holder can be supported by means of the support device so that it can rotate about an axis of rotation. The support device can have a drive motor arranged on it to rotate the holder about the axis of rotation. In particular, the axis of rotation runs parallel to the transverse direction. On the side opposite the support device, the holder can optionally be supported by a rest unit, which can also provide a pivot bearing point. The support provided by the support device and the rest unit can be different, so that the holder is asymmetrically supported. In one sample embodiment, the support device and the rest unit that support the holder have different stiffnesses. Even in the case of such asymmetric support, the at least one pretensioning device counteracts deformation of the holder, and consequently a position deviation when the holder is loaded by the workpiece.

In a preferred embodiment, the support part and the holder part are made as an integral part from a uniform material, without a seam or joint. The support part and the holder part and preferably the entire holder can consist of gray cast iron material, for example GGG 60.

The workpiece holder device can be adjusted in a machine tool as follows:

Depending on the weight of the workpiece to be machined, a pretension is preadjusted through the at least one pretensioning device before the machine tool is put in operation and the workpiece is machined. Preferably the pretension is preadjusted before the workpiece is arranged in the workpiece holder device. Then, the workpiece or multiple workpieces of the same kind or of equal weight can be machined. The pretension is preferably only changed when a workpiece to be machined has a different weight from the respective workpiece that was to be machined before.

BRIEF DESCRIPTION OF THE DRAWINGS

Preferred sample embodiments of the invention are explained in detail below using the attached drawings. The figures are as follows:

FIG. 3 is a schematic, block diagram-like side view of a sample embodiment of the workpiece holder device with at least one pretensioning device;

FIG. 4 is a schematic, block diagram-like side view of another sample embodiment of the workpiece holder device with at least one pretensioning device;

DETAILED DESCRIPTION OF SPECIFIC EMBODIMENTS

Figure 1:
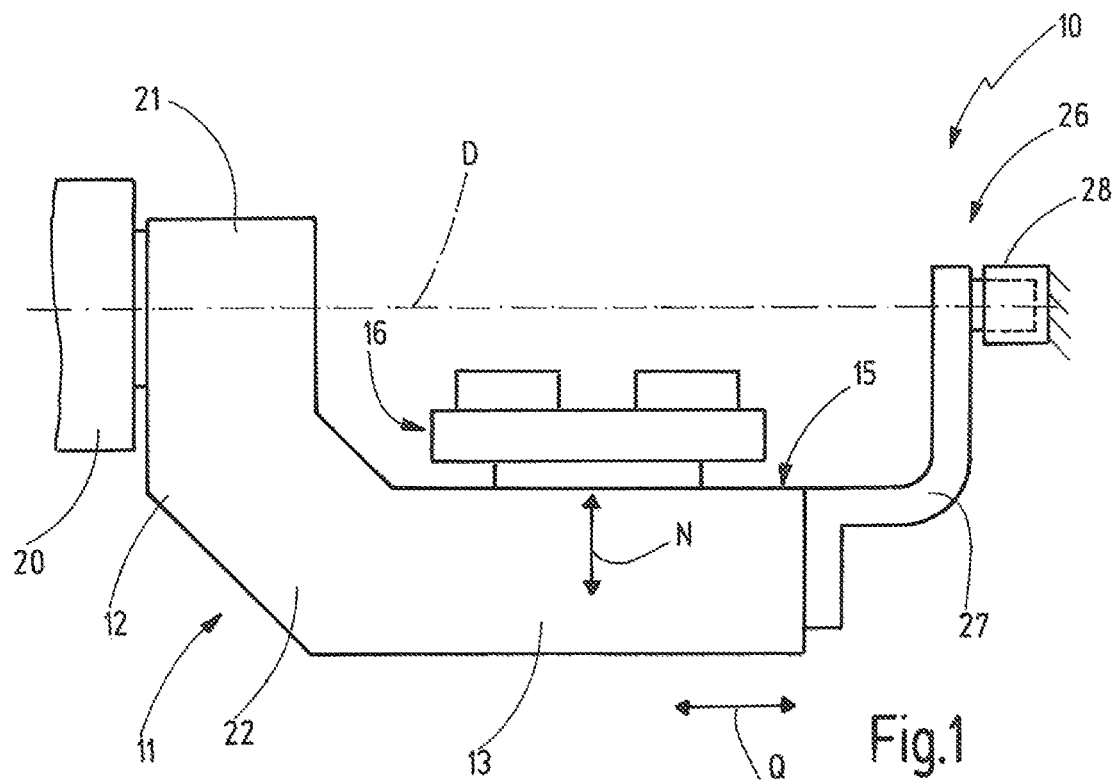
FIG. 1 is a schematic, block diagram-like side view of a workpiece holder device.

The invention relates to a workpiece holder device 10 for a machine tool (not shown). Various workpiece holder devices 10 are illustrated in FIGS. 1-4. The workpiece holder device 10 has a holder 11 with a support part 12 and a holder part 13. The holder 11 or at least the holder part 13 and the support part 12 are made in the form of a single integral piece and in the preferred sample embodiment consist of a gray cast iron material, especially GGG 60.

Figure 2:
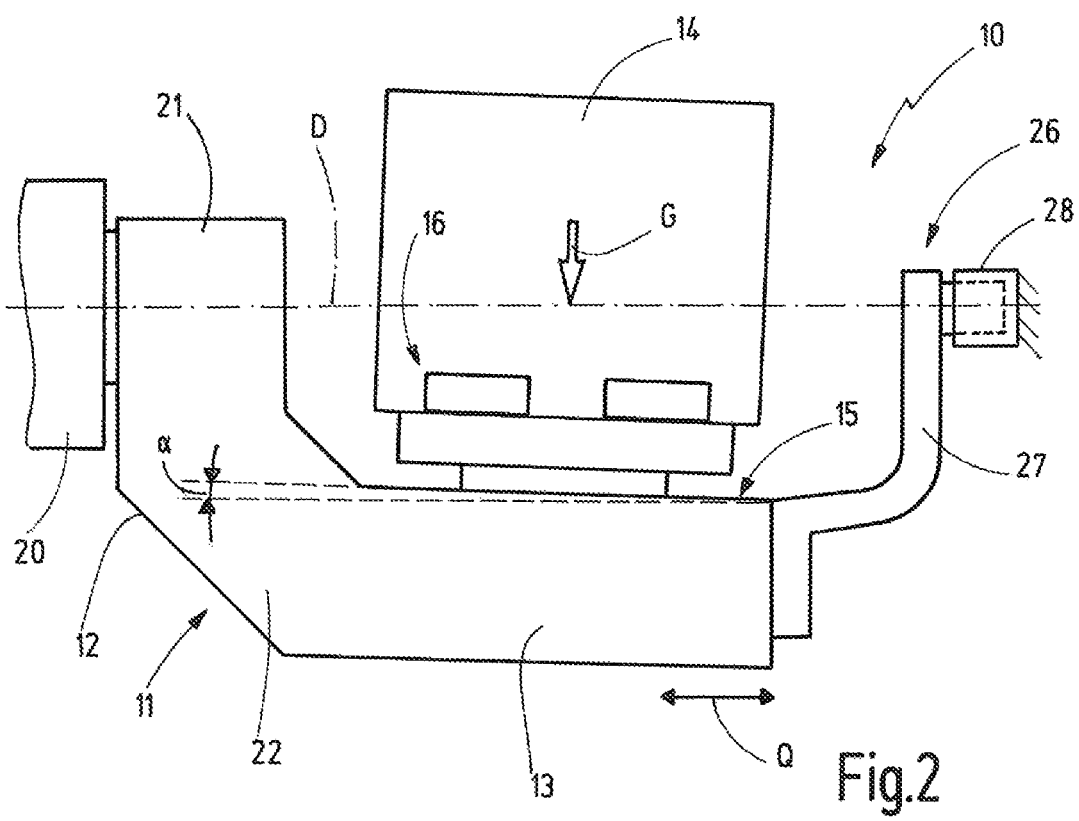
FIG. 2 shows the workpiece holder device from FIG. 1 with a workpiece, whose weight force acts on a holder of the workpiece holder device.

The holder part 13 is set up to hold a workpiece 14 indirectly or directly. As is illustrated in FIGS. 1 and 2, a holding device 16 is arranged on a top side 15 of the holder part 13, this holding device 16 being set up to clamp or chuck the workpiece 14.

The support part 12 supports the holder 11 on a support device 20 so that it can rotate about an axis of rotation D. The axis of rotation D extends parallel to a transverse direction Q. Preferably the axis of rotation D is arranged at a distance from, or offset from, the holder part 13 in a normal direction N at right angles to it. Therefore, when the holder 11 rotates about the axis of rotation, D the holder part 13 moves on a circular path about the axis of rotation D.

The support part 12 has an end section 21, with which it is connected with the support device 20. The end section 21 extends essentially at right angles to the transverse direction Q as far as a bent and/or curved connection section 22 of the support part 12, this bent and/or curved connection section 22 being arranged between the end section 21 and the holder part 13 and connecting the end section 21 with the holder part 13. The holder 11 or the holder part 13 together with the support part 12 is/are essentially L-shaped in side view at right angles to the axis of rotation D.

In the transverse direction Q along the axis of rotation D, the holder 11 can be supported by a rest unit 26 at a distance from the support device 20, and be rotatably supported at another pivot bearing point along the axis of rotation D. The rest unit 26 according to the example has a bow 27 that is connected with the holder part 13, according to the example at the end of the holder part 13 opposite the support part 12 in the transverse direction Q. The bow 27 connects the holder part 13 with a pivot bearing 28 that can be indirectly or directly supported on the machine frame or the machine base of a machine tool.

FIG. 2 illustrates how the workpiece holder device 10 or the holder 11 is loaded with the workpiece 14. The weight of the workpiece 14 exerts a weight force G on the holder part 13 and can elastically deform the holder 13. FIG. 2 schematically illustrates such a deformation. This can cause the holder part 13 to incline by an angle of inclination α relative to the transverse direction Q and displace it out of its optimal, desired alignment relative to the transverse direction Q. This is especially the case when the transverse direction Q is horizontally oriented and the normal direction N is essentially vertically oriented in the unloaded state of the holder 11. In this position, the holder 11 is most sensitive to the load caused by the weight force G according to the example.

To counteract such an elastic deformation due to the weight force G of a workpiece 14, the inventive holder 11 has at least one pretensioning device 32 arranged in it. The pretensioning device 32 is set up to pretension at least one part of the holder 11. The pretension can put the part of the holder 11 in question under a tensile stress or a compressive stress.

Figure 9:
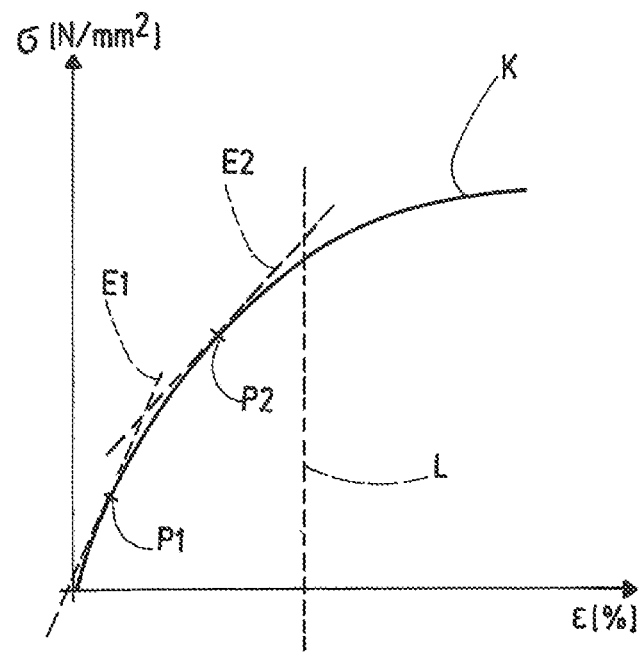
FIG. 9 is a schematic representation of a modulus of elasticity defined by a stress-strain diagram.

FIG. 9 schematically illustrates the stress-strain diagram for the holder 11. The exact shape of the stress-strain curve K can vary, depending on the material of the holder 11. The slope of the stress-strain curve K changes. The fact that at least one part of the holder 11 is already compressed or stretched by the at least one pretensioning device 32 makes it possible to reduce the modulus of elasticity E that corresponds to the slope of the stress-strain curve K. The slope decreases starting from the origin. At a first point P1 the holder 11 has a first modulus of elasticity E1, and at a second point P2 the holder has a second modulus of elasticity E2. The elastic deformation of the holder 11 depends on the magnitude of the weight force G and on the magnitude of the modulus of elasticity E. If the modulus of elasticity E is reduced by introducing pretension, the effect of the weight force G is less strong, so that the deformation of the holder 11 caused by the effect of the weight force G of the workpiece 14 is reduced.

The stress-strain curve K shown in FIG. 9 has a qualitatively comparable nonlinear shape in the 3rd quadrant, so that the above discussion applies not only for positive, but rather also for negative stresses σ and strains ε.

Since the holder 11 has different dimensions in the transverse direction Q and at right angles to the transverse direction Q and the normal direction N, the deformation of the holder 11 also depends on the rotational position of the holder 11 about the axis of rotation D. The inventive design and application of the pretension can reduce, and ideally completely avoid deviations from the desired alignment of the holder 11 when viewed in the transverse direction Q.

It can be seen from the graph in FIG. 9 that the modulus of elasticity decreases along the stress-strain curve K starting from the origin. Therefore, it is possible, depending on the weight of the workpiece 14, to produce a pretension by means of the at least one pretensioning device 32 to keep the effects of the weight force G of the workpiece 14 sufficiently small. Preferably, the pretension is selected to be only large enough to avoid a plastic deformation of the holder 11 due to the pretension and the weight force G. In FIG. 9, a dividing line L is drawn in that separates the area of elastic and plastic deformation.

Figure 5:
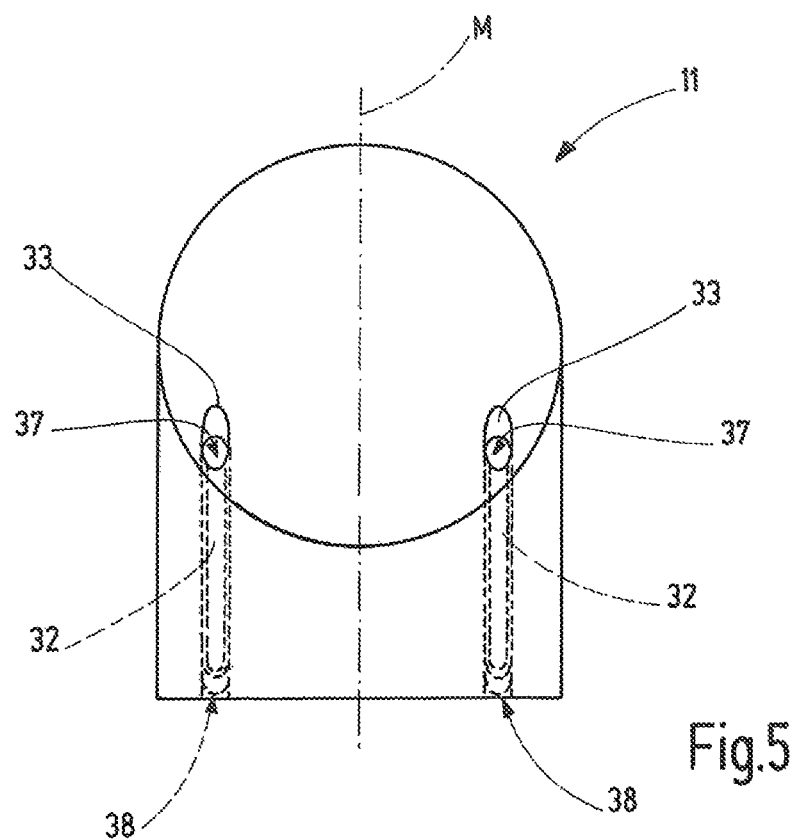
FIG. 5 is a schematic rear view of the holder of the workpiece holder device from FIG. 3.
Figure 6:
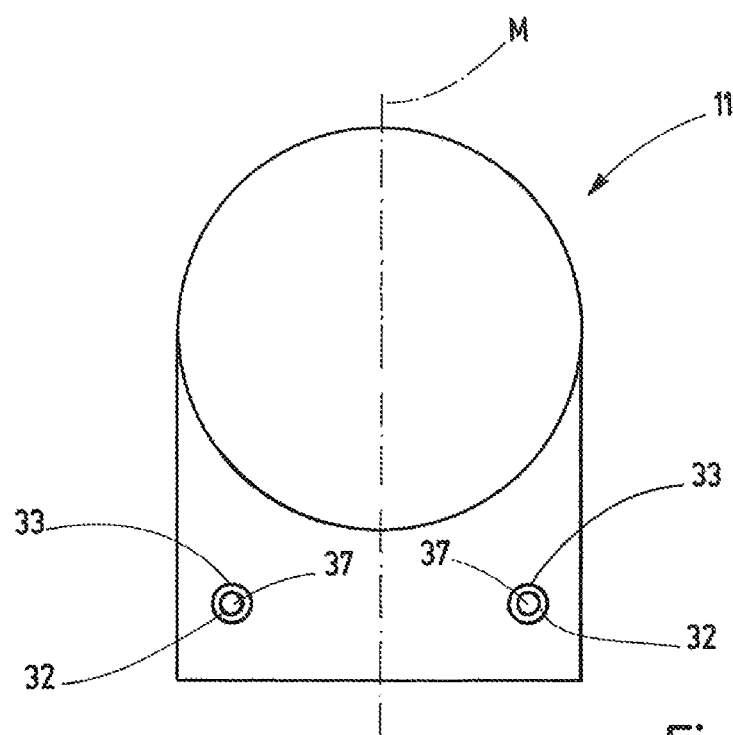
FIG. 6 is a schematic rear view of the holder of the workpiece holder device from FIG. 4.

In the sample embodiment described here, the workpiece holder device 10 has two separate pretensioning devices 32. Preferably, the respective tensile force or compressive force of each pretensioning device 32 can be preset separately and independently of the tensile force or compressive force of the respective other pretensioning device 32. The pretensioning devices 32 are arranged on opposite sides of the holder 11, at the same distance from a midplane M through the holder 11 (FIGS. 5 and 6). The midplane M extends through the center of the holder 11 along the axis of rotation D or parallel to the transverse direction Q. The pretensioning devices 32 are preferably arranged symmetrically to this midplane M in the holder 11.

In the preferred embodiments of the pretensioning devices 32 described here, each pretensioning device 32 extends in a straight line within a recess 33 in the holder 11. Each pretensioning device 32 passes through at least one part of the support part 12, in particular one part of the connection section 22. At least part of the pretensioning device 32 can also be arranged in the holder part 13. The pretensioning device 32 can extend parallel to the transverse direction Q, or it can be inclined with respect to the transverse direction Q. Preferably, each pretensioning device 32 extends parallel to the midplane M.

Figure 7:
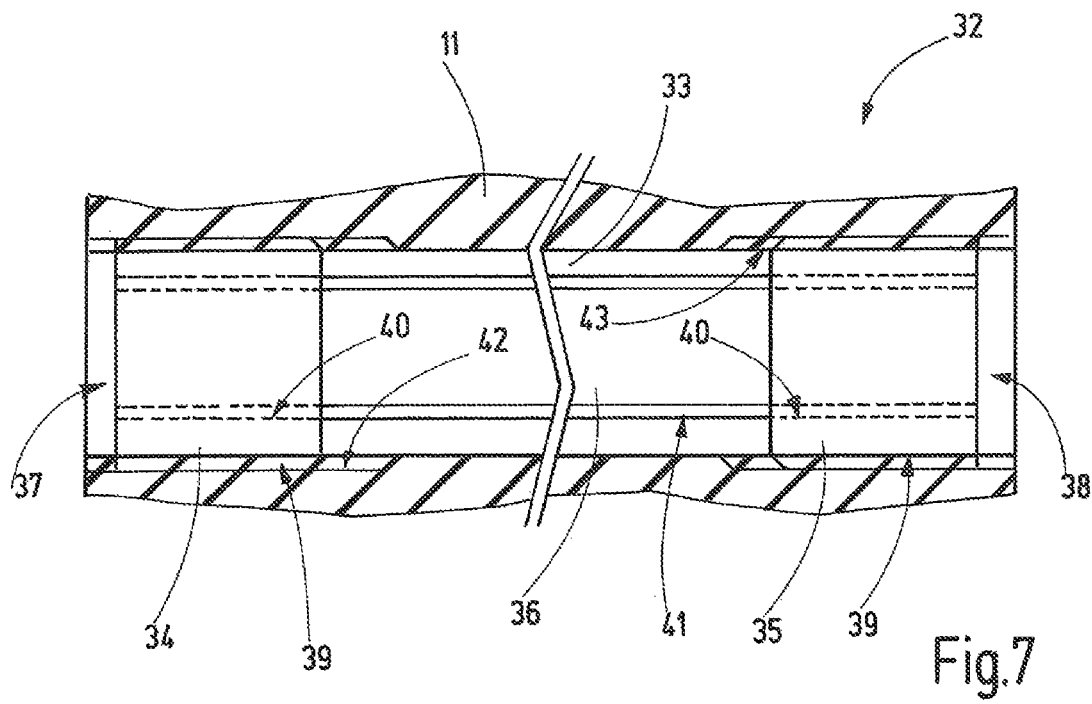
FIG. 7 is a schematic representation of a sample embodiment of a pretensioning device of the workpiece holder device according to FIGS. 3-6.

FIG. 7 shows a sample embodiment of the design of a preferred pretensioning device 32. In this sample embodiment, the pretensioning device 32 works purely mechanically. This embodiment has no elements that are subject to fluidic and/or electrical control or action. The pretensioning device 32 according to FIG. 7 has a first bushing 34, a second bushing 35, and a threaded rod 36. The first bushing 34 forms a first end 37 of the pretensioning device 32, and the second bushing 35 forms a second end 38 of it that is opposite the first end 37. Each bushing 34 has a bushing outer thread 39 and a bushing inner thread 40. The threaded rod 36 has a rod outer thread 41. The rod outer thread 41 of the threaded rod 36 is screwed into a respective section of the bushing inner thread 40. In the sample embodiment illustrated in FIG. 7, the rod outer thread 41 extends along the entire threaded rod 36. A possible variation of this is for the threaded rod 36 to have a rod outer thread 41 in each of its two end sections, each of the two rod outer threads being screwed into one of the two bushings 34 or 35.

The recess 33 in the holder 11 contains a first holder inner thread 42 and, at a distance from the first holder inner thread 42, a second holder inner thread 43. The bushing outer thread 39 of the first bushing 34 is screwed into the first holder inner thread 42. The bushing outer thread 39 of the second bushing 35 is screwed into the second holder inner thread 43. The two bushings 34, 35 are connected together through the threaded rod 36. Varying the length of the pretensioning device 32 can introduce a compressive force or tensile force into the holder 11 between the connection point of the first bushing 34 with the holder 11 and the connection point of the second bushing 35 with the holder 11. The threaded rod 36 can pretension the two bushings 34, 35 away from one another to produce a compressive force and toward one another to produce a tensile force. The tensile force compresses the holder 11 between the connection points or the bushings 34, 35, and producing a compressive force stretches the holder 11 between the connection points or the bushings 34, 35.

To adjust the tensile force or compressive force, the sample embodiment provides that the thread pitches of the bushing outer thread 39 and of the bushing inner thread 40 are of different sizes in at least one of the two bushings 34, 35. For example, the difference in the thread pitches between the bushing outer thread 39 and the bushing inner thread 40 can be 0.5 mm. This difference in the pitch can keep the required torque between the bushing 34, 35 and the holder inner thread 42, 43 and between the bushing inner thread 40 and the rod outer thread 41 sufficiently small to produce the desired pretension (tensile force or compressive force). In one sample embodiment, the bushing outer thread 39 of the second bushing 35 has a pitch of 2 mm. The bushing inner thread 40 and the bushing outer thread 39 of the first bushing 34 each have a pitch of 1.5 mm.

In the sample embodiment according to FIGS. 3 and 5, the first end 37 and the second end 38 are arranged offset to one another in the normal direction N. According to the example, the first end 37 is located closer to the axis of rotation D than the second end 38. The first end 37 is arranged in the recess 33 in the support part 12 of the holder 11. The second end 38 is arranged farther away from the support device 20 in the transverse direction Q than the first end 37 is. The second end 38 can be located within the recess 33 in the support part 12 or in the holder part 13. In the sample embodiment according to FIGS. 3 and 5, the inclination of the pretensioning devices 32 relative to the axis of rotation D can lie, for example, in the range from 60 to 70 or up to 75 degrees.

In the sample embodiment illustrated in FIG. 4, the pretensioning devices 32 extend parallel to the transverse direction Q. In this embodiment, the second end 38 is arranged in the recess 33 within the holder part 13, while the first end 37 is arranged in the support part 12.

In the sample embodiments according to FIGS. 3-6, the recesses 33 are in the form of through holes, to simplify the assembly of the pretensioning devices 32. The illustrated embodiment could also be modified so that the holder inner thread 42, 43 is in aligned through holes or blind holes in the holder 11 that are arranged at a distance from one another. Part of the pretensioning devices 32 between the two ends 37, 38 can then be exposed and run outside of the holder 11. For example, the threaded rod 36 could be accessible from outside in a middle area between the bushings 34, 35.

Figure 8:
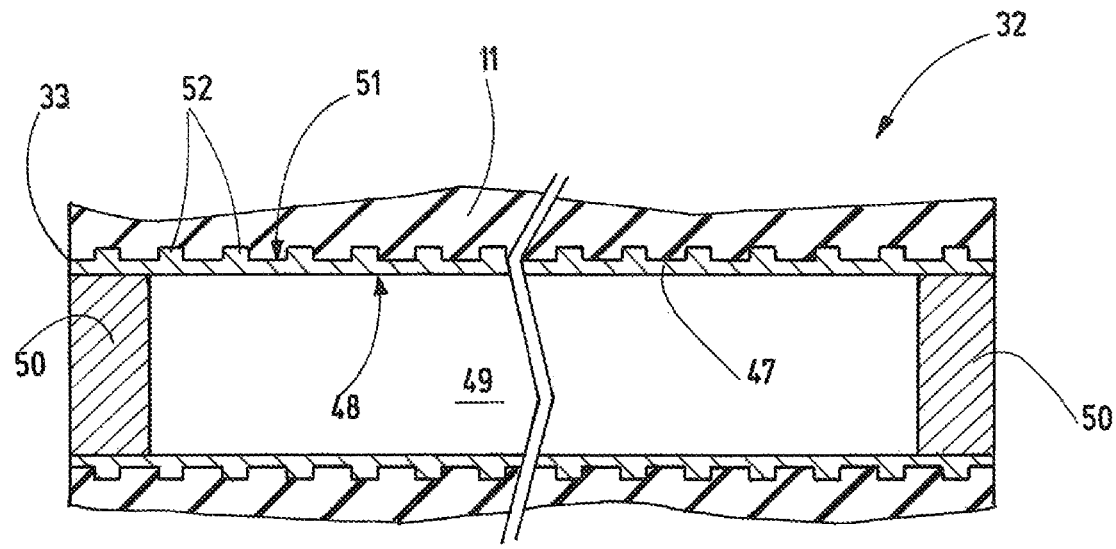
FIG. 8 is a schematic representation of another sample embodiment of a pretensioning device of the workpiece holder device according to FIGS. 3-6.

FIG. 8 illustrates an alternative sample embodiment of the pretensioning device 32, which can only produce a compressive force as pretension in the holder 11. The pretensioning device 32 according to FIG. 8 works hydraulically. The holder 11 has a cylindrical, according to the example circular cylindrical, tube 47 inserted into it, according to the example integrally cast in it. The inner wall 48 of the tube 47 delimits a pressure chamber 49 in the peripheral direction. The tube 47 is sealed fluid-tight by one sealing part 50 at each opposite end. A fluid pressure, in particular a hydraulic pressure, is produced within the pressure chamber 49 by pressure filling the pressure chamber 49 with a hydraulic medium. This pressure causes the two sealing parts 50 to be pushed away from one another and supported, through the tube 47, on the holder 11. This allows a compressive force to be produced in the tube 47 or the pressure chamber 49, which stretches or expands the holder 11 along the tube 47.

As is illustrated in FIG. 8, the outer wall 51 of the tube 47, this outer wall 51 being opposite the inner wall 48, has an uneven contour. For example, the outer wall 51 can have at least one anchoring element, e.g., a projection 52 on it. For example, the outer wall 51 of the tube can have a tube outer thread. Alternatively, there can also be multiple separate projections 52, which extend, for example, coaxially about the longitudinal axis of the tube 47. When the tube 47 is integrally cast into the holder 11, the uneven outer wall 51 anchors the tube in the holder 11, so that the pressure in the pressure chamber 49, which stretches the tube 47 in its longitudinal direction, can be transferred to the holder 11. Such anchoring elements on the outer wall 51 of the tube 47 are present at least in the area of the two opposite tube ends. In the sample embodiment illustrated in FIG. 8, the anchoring elements in the form of projections 52 are arranged essentially uniformly distributed along the tube 47.

Figure 10:
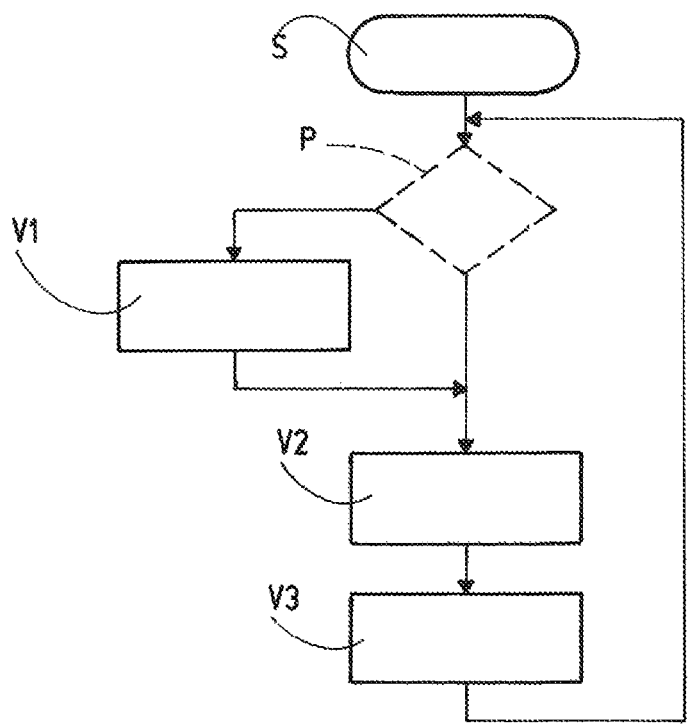
FIG. 10 is a flow chart of a process for using the workpiece holder device in a machine tool, this process comprising adjustment of the workpiece holder device in the machine tool.

Using the inventive workpiece holder device 10 in a machine tool makes it possible to execute a process that is schematically illustrated in FIG. 10. After the start S of the process and before the machining of the workpiece 14, first the pretension of the at least one pretensioning device 32 is adjusted in a first process step V1, to adjust the holder 11. The amount of the pretension is adjusted according to the weight force G of the workpiece 14 to be machined. Next, in a second process step V2, the workpiece 14 is arranged on the holder 11 and held by means of the holding device 16. In a third process step V3, the workpiece 14 is machined, and after the machining it is removed from the workpiece holder device 10. Then, another workpiece 14 to be machined can be arranged in the workpiece holder device 10.

As long as workpieces 14 of the same kind are being machined, the adjusted pretension is maintained. After that, if workpieces with a different weight are supposed to be machined, the pretension of the at least one pretensioning device 32 is adjusted according to the changed weight. Therefore, the process can optionally contain a test step P after the start S, this test step P involving first checking whether the workpiece 14 to be machined has the same weight as the previously machined workpiece. If this is the case, the previous adjustment of the pretensioning force is not changed, and the process continues with the second process step. If the workpiece to be machined has a different weight than the previously machined workpiece, the process continues in the first process step V1 (adjustment), in which the pretension is preadjusted to adapt it to the weight force of the workpiece 14 to be machined.

Thus, the pretensioning device 32 can adjust the workpiece holder device 10 or the holder 11, to minimize or to avoid deviations in the desired position or alignment of the workpiece 10 due to its weight force G. During the machining of the workpiece 14 the adjusted pretensioning force preferably remains constant.

The invention relates to a workpiece holder device 10 for a machine tool. The workpiece holder device 10 has a holder 11, which has a support part 12 and a holder part 13. The support part 12 supports the holder 11 on a support device 20, preferably so that the holder 11 can rotate about an axis of rotation D. The holder part 13 is set up to hold a workpiece 14 indirectly or directly. To avoid, or at least minimize deviations from a desired alignment of the holder part 13 based on elastic deformation of the holder 11 due to the weight force G of the workpiece 14, the holder 11 has at least one mechanical or hydraulic pretensioning device 32 arranged on or in it. The pretensioning device 32 can be used to pretension the material of the holder 11, so that the pretensioning device 32 applies a tensile stress or a compressive stress to at least one part of the holder 11. This can counteract a deviation of position due to an elastic deformation of the holder 11.

LIST OF REFERENCE NUMBERS

10 Workpiece holder device
11 Holder
12 Support part
13 Holder part
14 Workpiece
15 Top side
16 Holding device
20 Support device
21 End section of support part
22 Connection section of support part
26 Rest unit
27 Bow
28 Pivot bearing
32 Pretensioning device
33 Recess
34 First bushing
35 Second bushing
36 Threaded rod
37 First end
38 Second end
39 Bushing outer thread
40 Bushing inner thread
41 Rod outer thread
42 First holder inner thread
43 Second holder inner thread
47 Tube
48 Inner wall of tube
49 Pressure chamber
50 Sealing part
51 Outer wall of tube
52 Projection
α Angle of inclination
ε Strain
σ Stress
D Axis of rotation
G Weight force
K Stress-strain curve
L Dividing line
M Midplane
N Normal direction
P Test step
Q Transverse direction
S Start
V1 First process step
V2 Second process step
V3 Third process step

What is claimed is:

1. A workpiece holder device for a machine tool comprising:
a holder configured to hold or clamp a workpiece, the holder having a support part that is connected to a support device to support the holder, the holder being rotatably supported about a rotary axis by the support device, and the holder having a holder part extending away starting from the support part, the holder part and the support part being formed as a single integral piece, wherein the holder part is arranged with distance to the rotary axis in a direction orthogonal to the holder part or the rotary axis;
and at least one pretensioning device arranged in the holder so as to pretension at least one part of the support part and/or of the holder part, wherein the at least one pretensioning device is anchored to the holder at a first end and a second end opposite the first end, such that the pretension is produced between these ends and wherein the at least one pretensioning device has a first bushing at the first end and a second bushing at the second end, each bushing having a bushing inner thread and a bushing outer thread, and the bushing inner thread and the bushing outer thread of at least one of the first bushing and the second bushing having different thread pitches, wherein the bushing outer threads of first bushing and the second bushing are screwed into an associated inner thread of the holder.

2. A workpiece holder device according to claim 1, wherein an amount of the pretension in the at least one part of the support part and/or of the holder part is selected to change a modulus of elasticity of the at least one part of the support part and/or of the holder part.

3. A workpiece holder device according to claim 1, wherein the at least one pretensioning device has a threaded rod, one section of which is screwed into the bushing inner thread of the first bushing and the second bushing.

4. A workpiece holder device according to claim 1, wherein a pretension of the at least one pretensioning device for adjusting the holder part is preset according to a weight force of the workpiece to be machined.

5. A workpiece holder device according to claim 1, wherein the at least one pretensioning device is multiple pretensioning devices.

6. A workpiece holder device according to claim 5, wherein pretensions of the multiple pretensioning devices are independently adjustable.

7. A workpiece holder device according to claim 5, wherein the multiple pretensioning devices are arranged symmetrically to a midplane through the holder.

8. A workpiece holder device according to claim 1, wherein the first end and the second end of the at least one pretensioning device are arranged offset to one another in the direction orthogonal to the holder part or the rotary axis.

9. A workpiece holder device according to claim 1, wherein on a side opposite the support device, the holder is supported by means of a rest unit.

10. A workpiece holder device according to claim 1, wherein the holder is comprised of a gray cast iron material.

11. A process for adjusting a machine tool workpiece holder device according to claim 1, comprising:
presetting a pretension of the at least one pretensioning device according to a weight force of a workpiece to be machined before the workpiece is machined.

12. The process according to claim 11, further comprising:
keeping a preset pretension of the at least one pretensioning device unchanged during machining of the workpiece.

* * * * *